US011603015B2

United States Patent
Kaiser et al.

(10) Patent No.: US 11,603,015 B2
(45) Date of Patent: Mar. 14, 2023

(54) METHOD AND SEAT CONTROL SYSTEM FOR AUTOMATIC LATERAL REPOSITIONING OF A CHILD SAFETY SEAT ON A BACK SEAT OF A MOTOR VEHICLE

(71) Applicants: Hyundai Motor Company, Seoul (KR); Kia Motors Corporation, Seoul (KR)

(72) Inventors: Regina Kaiser, Darmstadt (DE); Margaux Krause, Pinckney, MI (US); Bilal Javaid, Ada, MI (US); Ingmar Langer, Darmstadt (DE); Michael Schreiber, Frankfurt am Main (DE); Amanda Christiana, Ann Arbor, MI (US); Dominik Matheis, Hanau (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 741 days.

(21) Appl. No.: 16/577,433

(22) Filed: Sep. 20, 2019

(65) Prior Publication Data
US 2021/0031656 A1 Feb. 4, 2021

(30) Foreign Application Priority Data
Aug. 2, 2019 (DE) .......................... 102019211618.3

(51) Int. Cl.
*B60N 2/06* (2006.01)
*B60N 2/00* (2006.01)
(Continued)

(52) U.S. Cl.
CPC ............. *B60N 2/062* (2013.01); *B60N 2/002* (2013.01); *B60N 2/0244* (2013.01); *B60N 2/26* (2013.01);
(Continued)

(58) Field of Classification Search
None
See application file for complete search history.

(56) References Cited

U.S. PATENT DOCUMENTS 10,730,413 B1 * 8/2020 Riad ..................... B60N 2/0806
11,254,244 B1 * 2/2022 Presna ................. B60N 2/2866
(Continued)

FOREIGN PATENT DOCUMENTS

DE 10212222 A1 10/2003
DE 10317538 A1 11/2004
(Continued)

*Primary Examiner* — David E Allred
(74) *Attorney, Agent, or Firm* — Slater Matsil, LLP

(57) ABSTRACT

A method can be used for automatic lateral repositioning of a child safety seat on a back seat of a motor vehicle. The child safety seat is configured to move laterally across the back seat between lateral sides of the motor vehicle. The method includes determining the lateral position of the child safety seat on the back seat of the motor vehicle, determining a current or intended parking situation of the motor vehicle, deciding which lateral side of the motor vehicle is a preferred access side for the determined parking situation, and laterally repositioning the child safety seat to a preferred position at the preferred access side of the motor vehicle.

15 Claims, 6 Drawing Sheets

(51) Int. Cl.
  *B60N 2/02* (2006.01)
  *B60N 2/26* (2006.01)
(52) U.S. Cl.
  CPC ............ *B60N 2002/0216* (2013.01); *B60N 2002/0256* (2013.01); *B60N 2002/0268* (2013.01)

(56) References Cited

U.S. PATENT DOCUMENTS

| | | | | |
|---|---|---|---|---|
| 2007/0290554 | A1* | 12/2007 | Teshima | B60N 2/0244 |
| | | | | 296/64 |
| 2008/0023254 | A1* | 1/2008 | Prost-Fin | G08G 1/168 |
| | | | | 701/41 |
| 2011/0298257 | A1* | 12/2011 | Abadilla | B60N 2/2863 |
| | | | | 29/428 |
| 2014/0310702 | A1* | 10/2014 | Ricci | G06Q 20/321 |
| | | | | 717/173 |
| 2016/0203377 | A1* | 7/2016 | Irie | H04N 5/232945 |
| | | | | 348/118 |
| 2016/0264021 | A1* | 9/2016 | Gillett | H04M 1/72412 |
| 2018/0136655 | A1* | 5/2018 | Kim | G05D 1/0088 |
| 2018/0180731 | A1* | 6/2018 | Inoue | G01S 13/86 |
| 2018/0354394 | A1* | 12/2018 | Travieso | B60N 2/283 |
| 2019/0271550 | A1* | 9/2019 | Breed | G08G 1/096716 |
| 2019/0275938 | A1* | 9/2019 | Matsushita | E05F 15/73 |
| 2019/0329791 | A1* | 10/2019 | Oba | B60K 28/063 |
| 2020/0047641 | A1* | 2/2020 | D'Eramo | B60N 2/14 |
| 2020/0164770 | A1* | 5/2020 | Lee | G06V 20/56 |
| 2020/0189418 | A1* | 6/2020 | Sailer | B60N 2/14 |
| 2020/0193830 | A1* | 6/2020 | Kim | G08G 1/166 |
| 2020/0353934 | A1* | 11/2020 | Vulcu | A61B 5/165 |
| 2020/0398826 | A1* | 12/2020 | Tsujino | B60W 50/14 |
| 2021/0009110 | A1* | 1/2021 | Jeong | G06V 20/584 |
| 2021/0016687 | A1* | 1/2021 | Van Hoecke | B60N 2/242 |
| 2021/0178936 | A1* | 6/2021 | Yetukuri | G01C 21/3605 |
| 2021/0271903 | A1* | 9/2021 | Kaneko | G06T 11/203 |
| 2021/0403040 | A1* | 12/2021 | Nakanishi | B60N 2/002 |

FOREIGN PATENT DOCUMENTS

| | | | | |
|---|---|---|---|---|
| DE | 102008017199 A1 | * | 10/2009 | ............ B60N 2/062 |
| EP | 1110810 B1 | | 11/2004 | |
| JP | 2020006908 A | * | 1/2020 | .......... B60N 2/0244 |
| WO | WO-2006087719 A1 | * | 8/2006 | ............ B60N 2/062 |

\* cited by examiner

FIG. 6
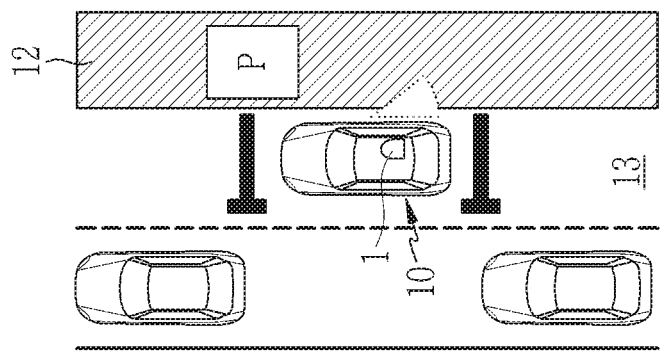
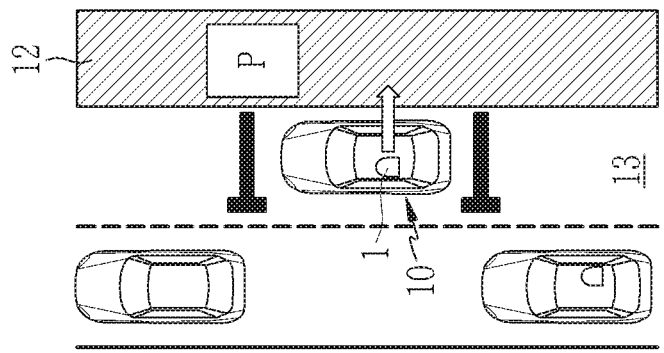
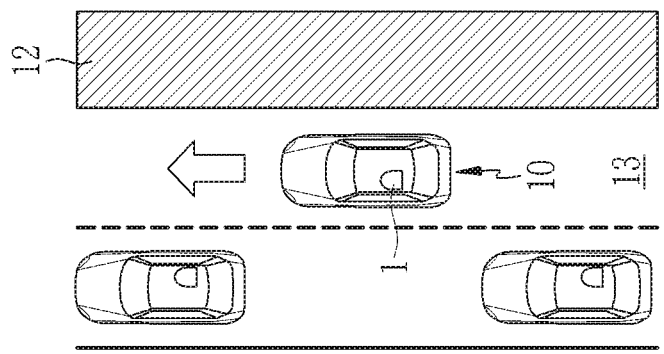

METHOD AND SEAT CONTROL SYSTEM FOR AUTOMATIC LATERAL REPOSITIONING OF A CHILD SAFETY SEAT ON A BACK SEAT OF A MOTOR VEHICLE

CROSS-REFERENCE TO RELATED APPLICATIONS

This application claims priority to German Patent Application No. 102019211618.3, filed on Aug. 2, 2019, which application is hereby incorporated herein by reference.

TECHNICAL FIELD

The present invention pertains to a method and a seat control system for automatic lateral repositioning of a child safety seat on a back seat of a motor vehicle.

BACKGROUND

Child safety seats, e.g., infant carriers, booster seats and so on, are seats designed specifically to protect and secure children within vehicles. Typically these seats are provided as separate components that have to be installed in the vehicles by the vehicle owners. Such child safety seats are usually secured at predefined positions on top of normal vehicle seats, e.g., on a rear bench. However, a certain chosen position may not necessary be optimal for all possible driving and/or parking situations.

In one example, a vehicle may be parked in parallel to a street with the driver's side of the vehicle facing the street. If in that case a child safety seat has been secured on the rear bench on the driver's side of the vehicle, the driver and/or operator may need to access the seat from the street, which can be inconvenient and not without any risk. It thus would be helpful if the seat could be (re-)positioned easily depending on the respective parking situation.

Current motor vehicles are increasingly connected with sensors and telematics in order to implement advanced driver-assistance systems and/or autonomous driving functionalities. For example, cars may be provided with multiple sensors and various techniques for acquiring data from the environment, e.g., to provide accurate detection of other vehicles, of the adjacent road, of the general environment and so on. Typical technologies that are utilized for this purpose include radar, laser, LIDAR, ultrasound, cameras, stereo vision, computer vision, odometry, accelerometers, gyroscopes, GPS, and so on. To produce a more consistent, accurate and useful view of the environment, a variety of such sensors may be provided on a car and the information from these sensors may be combined within a sensor system, which may be utilized for various purposes, e.g. in order to assess a current parking situation.

European patent document EP 1 no 810 B1 describes a vehicle console, which is movably contained within a vehicle and which is adapted to selectively and operatively support a child safety seat.

SUMMARY

Against this background, there is a need to find solutions for positioning child safety seats with improved security and comfort.

According to an aspect of the invention, a method for automatic lateral repositioning of a child safety seat on a back seat of a motor vehicle is provided. The child safety seat is configured to move laterally across the back seat between lateral sides of the motor vehicle. The method comprises determining, by a determination unit of the motor vehicle, the lateral position of the child safety seat on the back seat of the motor vehicle. The determination unit determines a current and/or intended parking situation of the motor vehicle. A decision unit of the motor vehicle decides which lateral side of the motor vehicle is a preferred access side for the determined parking situation. A seat actuation device laterally repositions the child safety seat to a preferred position at the preferred access side of the motor vehicle.

According to another aspect of the invention, a seat control system for automatic lateral repositioning of a child safety seat on a back seat of a motor vehicle is provided. The seat control system comprises a determination unit configured to determine a lateral position of the child safety seat on the back seat of the motor vehicle and to determine a current and/or intended parking situation of the motor vehicle. A decision unit is configured to decide which lateral side of the motor vehicle is a preferred access side for the determined parking situation. A seat actuation device is configured to laterally reposition the child safety seat to a preferred position at the preferred access side of the motor vehicle by moving the child safety seat laterally across the back seat between lateral sides of the motor vehicle.

According to yet another aspect of the invention, a motor vehicle with a seat control system according to the invention is provided.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

FIG. 6 schematically shows another exemplary parking situation with the motor vehicle of FIG. 2 using the method of FIG. 4.

Figure 1:
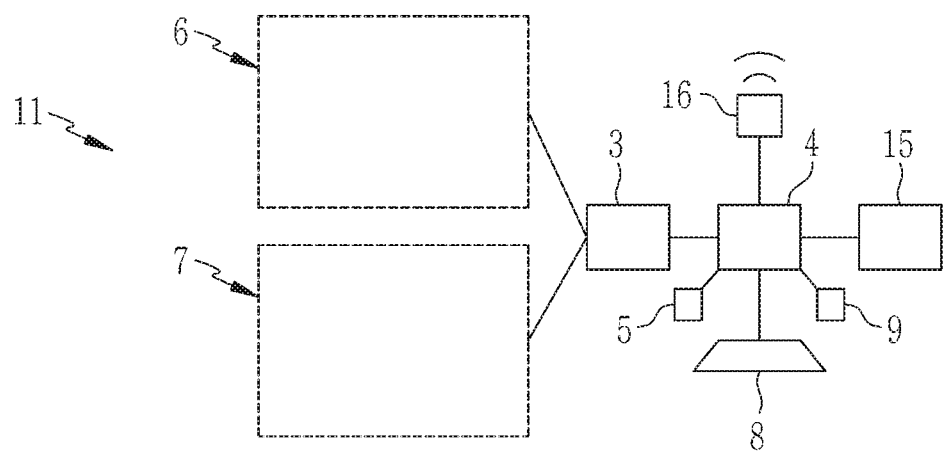
FIG. 1 schematically depicts details of a seat control system for automatic lateral repositioning of a child safety seat according to an embodiment of the invention.

The following reference symbols can be used in conjunction with the drawings:

1 child safety seat
2 back seat
3 determination unit 4 decision unit
5 seat actuation device
6 environmental sensor system
6a, 6b camera
6c radar
6d ultrasonic sensor
7 seat occupancy sensor system
7a camera
7b seat-integrated occupancy sensor
8 driver interface
9 locking device
10 motor vehicle
11 seat control system
12 pavement
13 street
14 parking bay
15 assisted/autonomous driving unit
16 communication unit
17 seat connector
18 lateral seat adjustment rail
P parking space
M method
M0-M7 method steps

DETAILED DESCRIPTION OF ILLUSTRATIVE EMBODIMENTS

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

One idea disclosed herein is to reposition the child safety seat depending on the parking situation so that the seat can always be accessed on the safer and more comfortable side of the vehicle. The seat repositioning process is an automated process, which does not require the driver and/or operator to take any action. Instead the seat automatically moves to the side of the vehicle, which is the safer one for entering and/or exiting the vehicle. Movement of the seat may be realized, for example, by means of a rail system or the like, where a seat rail is arranged laterally on, at or in the back seat. The child safety seat may then slide along the rail from one lateral side of the vehicle to the other. The movement may be actuated, for example, by an electric motor, a gas spring or any other suitable means.

As a consequence, safety is increased for parents and infants in typical everyday situations involving parking on the street and/or on parking lots.

A current parking situation may be for example a current parking position of the vehicle on or at a street, on a parking lot, etc. However, alternatively or additionally also an intended parking situation may be taken into account, e.g., based on current driving data, navigation data, driving history data and so on.

It is understood that the term "vehicle" or "vehicular" or other similar term as used herein is inclusive of motor vehicles in general such as passenger automobiles including sports utility vehicles (SUV), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Furthermore, it is understood that the system may additionally allow manual adjustment of the child safety seat's position, e.g. in case the vehicle is turned off.

Advantageous embodiments and improvements of the present invention are found in the subordinate claims.

According to an embodiment of the invention, the seat control system may further comprise an environmental sensor system configured to acquire environmental data of the motor vehicle. The determination unit may be configured to determine the parking situation based on the environmental data.

For example, to detect an intended parking situation already while driving, several vehicle sensors may be used including cameras with object detection, e.g. 180° or 360° camera systems.

A GPS sensor in combination with a navigation map may allow determining the surroundings of the vehicle (street, one-way street, parking lot, road surface markings, and so on), as well as the direction of movement of the vehicle. Specifically, the direction of vehicle movement may be determined during a parking maneuver based on wheel arch sensors and steering angle information.

Ultrasonic sensors like parking sensors may be used to detect the position and the distance of vehicles in the front and the back of the vehicle.

Radar sensors normally used for blind spot and cross traffic detection may be employed to detect other vehicles nearby and may thus help to determine, for example, on which side of the street the vehicle is parked. The acquired information can then be used to decide on the preferred access side for the respective parking situation.

Alternative or additionally, a camera system may be activated, e.g., at lower vehicle speed, to optically determine the vehicle's direction of movement and the intended parking position by identifying objects and signifiers in the surroundings, e.g. boundary lines of a parking bay.

Moreover, LIDAR sensors may be used to measure precisely the distance between vehicles, e.g., on a parking lot.

According to an embodiment of the invention, the environmental sensor system may be configured to detect if the parking situation includes parallel parking, bay parking and/or angle parking.

Parallel parking refers to parking a vehicle parallel to a road in line with other parked vehicles, wherein a front bumper of one vehicle faces a back bumper of an adjacent one. With perpendicular parking, also known as bay parking, vehicles are parked side to side, perpendicular to an aisle, curb, or wall or the like. This type of car parking is commonly used in car parking lots and car parking structures. Angle parking, also known as echelon parking, is similar to perpendicular parking for these vehicles, except that the vehicles are arranged at an angle to the aisle.

Depending on the respective parking orientation and arrangement, different sides of the vehicle may serve as a preferred access side.

For example, the preferred access side of the motor vehicle may be the lateral side of the motor vehicle facing away from a street in case of parallel parking. The side facing away from the street usually faces a pavement or the like, which thus makes it the safer side for letting a child exit and/or enter a vehicle. Using the side facing the street the child and/or the adult would have to step on the street for entering/exiting the vehicle. For example, an adult would have to turn her or his back towards the street in order to help a child.

In another example, the preferred access side of the motor vehicle may be a driver's side of the motor vehicle in case of bay parking and/or angle parking. For example, it may be difficult in tight parking lots to open the doors on the co-driver's side of a vehicle wide enough to lean into the car for strapping/unstrapping the child to/from a safety seat. During such a procedure, scratches and dents in the door of this or another vehicle may occur. The driver's side of the vehicle on the other hand may offer more space for letting the child comfortably and safely exit and/or enter the vehicle.

Alternatively however, a sensor system of the vehicle may assess the parking bay next to the co-driver's side of the vehicle to be vacant for the moment. In that case, the system may define the co-driver's side of the vehicle as the preferred access side instead of the driver's side even in a bay parking scenario.

According to an embodiment of the invention, the parking situation may be determined based on navigation data of a navigation system of the motor vehicle and/or a drive history of the motor vehicle.

For example, information from a vehicle's driver history may be taken into account to predict the preferred access side in advance. For example if someone drives a child every morning to the kindergarten, he or she may tend to choose the same parking position every morning. In this case the repositioning of the seat may be initiated even before the information of all vehicle sensors are available.

According to an embodiment of the invention, the seat control system may further comprise a seat occupancy sensor system configured to acquire occupation data of the child safety seat. The determination unit may be configured to determine if the child safety seat is occupied based on the occupation data. The seat occupancy sensor system may not only comprise the usual occupancy sensors integrated into the vehicle seats but also interior cameras or other devices, which are able to detect objects and/or persons within the vehicle.

According to an embodiment of the invention, the seat control system may further comprise a driver interface configured to output a notification that the child safety seat cannot be moved to the preferred position on the preferred access side in case an object blocks movement of the child safety seat across the back seat to the preferred position. For example, an interior camera may detect objects and/or persons on the back seat, e.g. a rear bench, by object reconstruction. The system may then inform the driver and/or the passengers that movement of the child safety seat may not be possible. Alternatively or additionally, occupancy sensors on the back seat may be used to detect the presence of a person on the back seat, e.g. adjacent the child safety seat. The corresponding notification may be transmitted, for example, via an infotainment system, a hands-free device, a smartphone of the driver and so on.

According to an embodiment of the invention, the seat control system may further comprise a locking device configured to lock the child safety seat in the preferred position until the parking situation requires a different lateral position of the child safety seat. To this end, any suitable device may be employed that offers an adjustable fixation of the child safety seat in a particular position along the lateral extension of the back seat, e.g. along a seat rail, for example a latching mechanism or similar.

The invention will be explained in greater detail with reference to exemplary embodiments depicted in the drawings.

Figure 2:
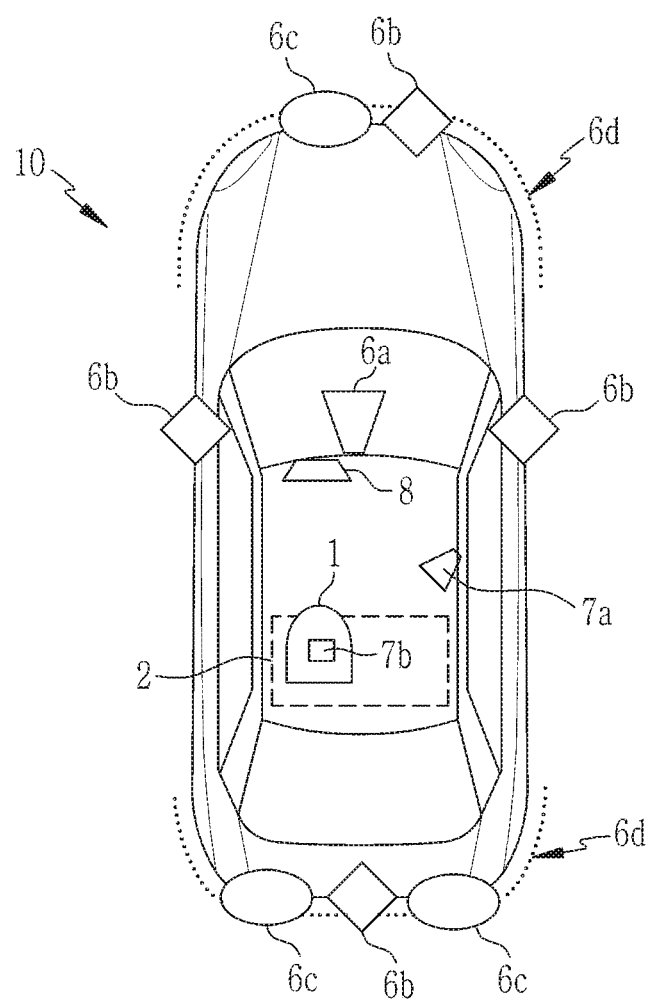
FIG. 2 schematically shows a motor vehicle comprising the seat control system of FIG. 1.
Figure 3:
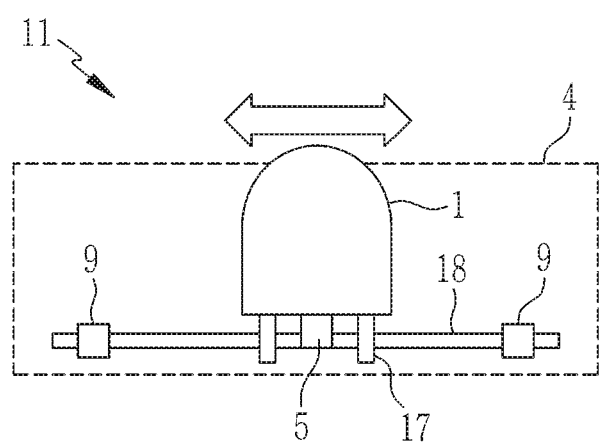
FIG. 3 schematically depicts further details of the seat control system of FIG. 1.

FIGS. 1 and 3 schematically depict details of a seat control system 11 for automatic lateral repositioning of a child safety seat 1 according to an embodiment of the invention. FIG. 2 schematically shows a motor vehicle 10 comprising the seat control system 11 of FIGS. 1 and 3.

The child safety 1 seat may be an infant seat, child seat, carrycot, convertible seat, booster seat or any other safety seat that may be installed inside a motor vehicle 10 and that is designed to protect children from injury during braking maneuvers, other rapid movements or vehicle collisions. Most commonly such seats have to be purchased and installed by vehicle owners. However, they may also be integrated directly into the vehicle's design.

The child safety seat 1 in FIGS. 1 to 3 is slidably mounted to a rear seat 2 of the vehicle 10, e.g. a rear bench seat, by means of a lateral seat adjustment rail 18, which means that the child safety seat 1 can be moved laterally across the back seat 2 by sliding along the lateral seat adjustment rail 18 between the two lateral sides of the vehicle 10. The rail 18 may be integrated in the back seat 2 in such a way that the seat 2 may still be used by other passenger without experiencing any discomfort. For example, the rail 18 may be positioned between the seat cushion and the seat backrest. Alternatively, the rail 18 may also be positioned on the top of the backrest.

The child safety seat 1 is mounted to the rail 18 via several seat connectors 17. Such seat connectors 17 may be configured according to the ISOFIX international standard for attachment points for child safety seats in passenger cars, which amongst others specifies the anchoring system for child safety seats. It defines standard attachment points to be manufactured into cars, enabling compliant child safety seats to be quickly and safely secured.

The child safety seat 1 is moved along the rail 18 by a seat actuation device 5, e.g. an electric motor or a gas spring or similar, and may be locked in specific positions by one or several locking devices 9, e.g., a latching or clip system or similar. As a result, the child safety seat 1 can be actively moved smoothly along the rail from one lateral side of the vehicle 10 to the other lateral side. The locking mechanism assures that the child safety seat 1 cannot move by itself, e.g., when the vehicle 10 drives a curve.

The seat control system 11 comprises a seat occupancy sensor system 7 communicatively coupled to a determination unit 3, the seat occupancy sensor system 7 being configured to acquire occupation data of the child safety seat 1, on which basis the determination unit 3 can determine if the child safety seat 1 is occupied. The seat occupancy sensor system 7 may comprise various sensors. In the depicted example it includes an interior camera 7a configured to monitor the child safety seat 1 as well as a common seat-integrated occupancy sensor 7b.

The interior camera 7a and/or the seat occupancy sensors 7b may also be used for other purposes, e.g., to detect objects on the back seat 2 and/or within the vehicle 10 blocking movement of the child safety seat 1 across the back seat 2, e.g., other passengers or cargo occupying part of the back seat 2.

The determination unit 3 of the seat control system 11 is further configured to determine the lateral position of the child safety seat 1 on the back seat 2, e.g., by means of respective sensors integrated into the rail 18, the seat actuation device 5, the safety seat 1 itself, the back seat 2 and/or the locking devices 9 (not shown).

Moreover, the determination unit 3 is configured to determine a current and/or intended parking situation of the motor vehicle 10. To this end, the determination unit 3 is communicatively coupled with an environment sensor system 6 comprising a variety of different sensor technologies as they are utilized in modern vehicles, in particular in assisted and/or autonomous driving systems, which make it possible to detect objects in the vicinity of the vehicle 10, e.g., other vehicles, persons, structures and so on, as well as road surface markings, traffic control signals, etc. The environmental sensor system 6 is configured to acquire environmental data of the motor vehicle 10, which are then used by the determination unit 3 to determine the parking situation of the vehicle 10.

The particular example of a sensor system 6 shown in FIGS. 1 and 2 comprises a front camera 6a and a 360°-view camera system comprising several individual cameras 6b arranged at several positions over the vehicle 10. The sensor system 6 further comprises several radars 6c, e.g. short-range and/or long-range radars, as well as ultrasonic sensors 6d. However, the person of skill may provide the vehicle 10 with other sensors depending on the particular application at hand. Furthermore, different sensor technologies and arrangements may be employed, e.g., lidars, laser scanners etc.

Based on the environmental data, the determination unit 3 is particularly able to assess if the vehicle 10 is positioned and/or approaching a parking space, e.g. a parking lot, a bay parking area and/or a parallel parking area adjacent to or on a street. Specifically, the environmental sensor system 6 is configured to detect if the parking situation includes parallel parking, bay parking and/or angle parking.

In addition to the environmental data from the environmental sensor system 6, the determination unit 3 may utilize navigation data of a navigation system of the motor vehicle 10 and/or a drive history of the motor vehicle 10. The navigation system may for example be integrated in and/or communicatively coupled to the determination unit 3 to this end.

The seat control system 11 further comprises a decision unit 4 configured to decide which lateral side of the motor vehicle 10 is a preferred access side for the determined parking situation. The decision unit 4 may be communicatively coupled to and/or integrated together with the determination unit 3 as part of a telematics and/or computing system of the motor vehicle 10. Moreover, the system 11 comprises additional units/devices like a communication unit 16, an assisted/autonomous driving unit 15 and a driver interface 8, all of which may be part of an assisted and/or autonomous driving system of the vehicle 10.

In one example, the decision unit 4 and determination unit 3 are part of a computing system that includes a processor and a memory that stores code to be executed by the processor. The code can, for example, be programmed to execute the method as described below.

Figure 4:
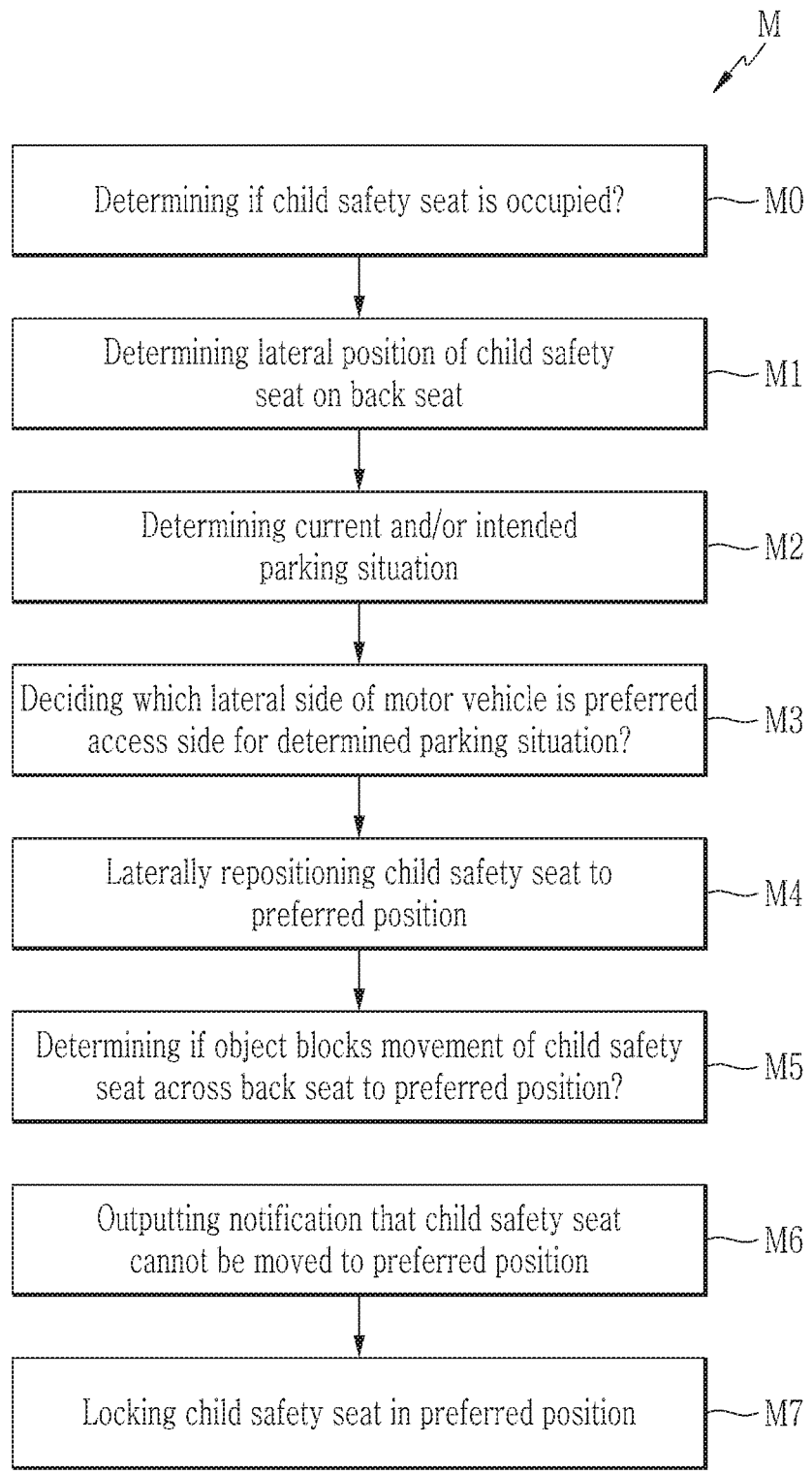
FIG. 4 shows a flow diagram of a method for automatic lateral repositioning of a child safety seat on a back seat of the motor vehicle of FIG. 2 using the seat control system of FIG. 1.

FIG. 4 shows a flow diagram of a method M for automatic lateral repositioning of the child safety seat 1 on the back seat 2 of the motor vehicle 10 of FIG. 2 using the seat control system of FIG. 1.

The method M comprises under M0 determining if the child safety seat 1 is occupied based on the occupation data acquired by the seat occupancy sensor system 7. The method M further comprises under M1 determining the lateral position of the child safety seat 1 on the back seat 2 of the motor vehicle 10. The method M further comprises under M2 determining a current and/or intended parking situation of the motor vehicle 10. The method M further comprises under $M_3$ deciding which lateral side of the motor vehicle 10 is a preferred access side for the determined parking situation. The method M further comprises under $M_4$ laterally repositioning the child safety seat 1 to a preferred position at the preferred access side of the motor vehicle 10. The method M further comprises under $M_5$ determining if an object blocks movement of the child safety seat 1 across the back seat 2 to the preferred position on the preferred access side. If this is answered in the affirmative, then the method M further comprises under M6 outputting, via the driver interface 8, a notification that the child safety seat 1 cannot be moved to the preferred position on the preferred access side. Finally, the method M comprises under $M_7$ locking the child safety seat 1 in the preferred position until the parking situation requires a different lateral position of the child safety seat 1.

Figure 5:
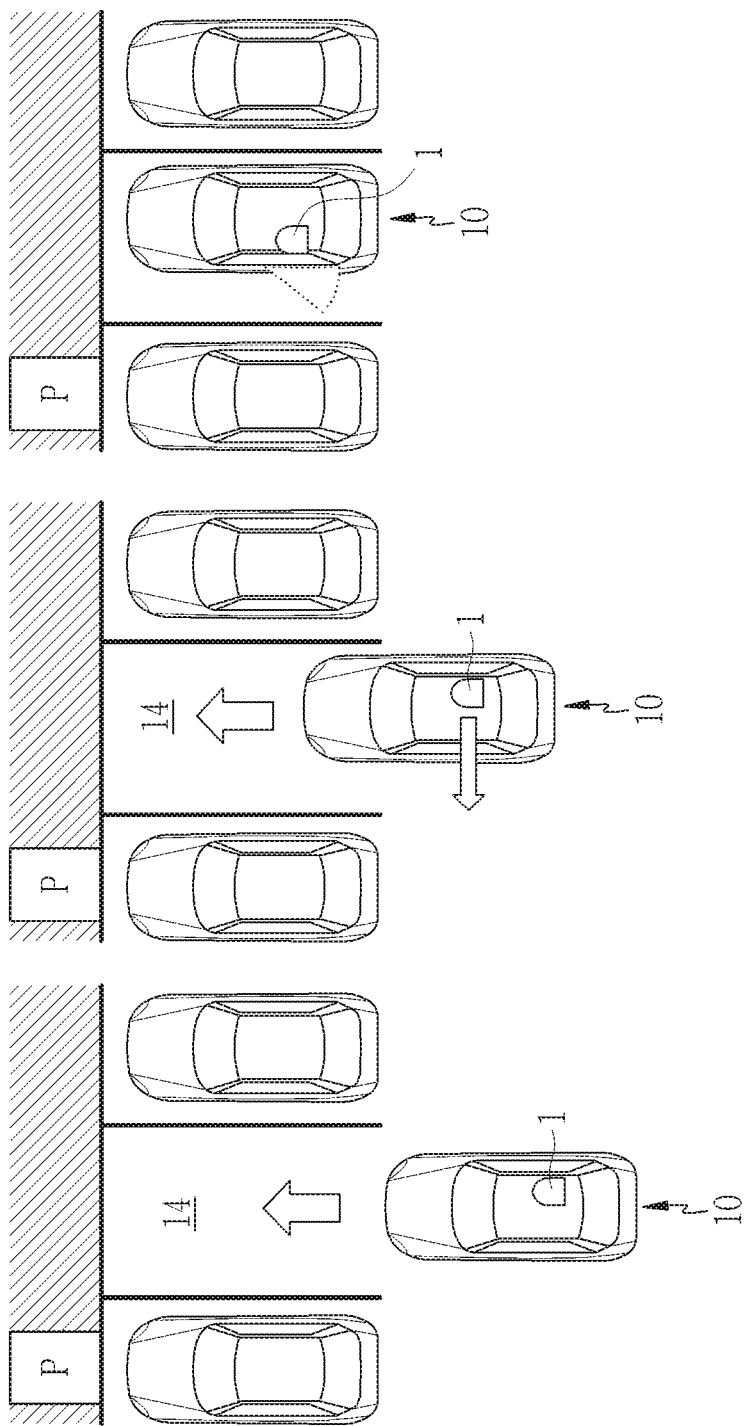
FIG. 5 schematically shows an exemplary parking situation with the motor vehicle of FIG. 2 using the method of FIG. 4.

FIGS. 5 and 6 provide two examples for different parking situations that benefit from the above described method such that safety and comfort are increased for the operator of the vehicle 10.

FIG. 5 depicts an example for a bay parking scenario, in which a vehicle 10 maneuvers into a parking bay 14 on a parking space P. In the beginning (left of FIG. 5), the child safety seat 1 is positioned on the co-driver of the vehicle 10 (in case of right-hand traffic). The environmental sensor system 6 of the vehicle 10 monitors the surroundings and other vehicles in the nearby parking bays. In this particular example, the preferred access side of the motor vehicle 10 may be defined as the driver's side of the motor vehicle 10. The rationale behind this is that the driver's side may offer more space for assessing the child safety seat 1, e.g. for letting a child comfortably and safely exit the vehicle 10.

Thus, the child safety seat 1 is moved by the seat control system 11 to the driver's side of the vehicle 10. This process may already be started before the vehicle 10 has even reached its intended parking position (middle of FIG. 5). It is understood however that the movement of the child safety seat 1 may also be initiated only after the vehicle 10 has reached the final parking position. In the shown example, the vehicle 10 has reached its parking position on the right of FIG. 5. Meanwhile the child safety seat 1 has moved to the driver's side of the vehicle and thus can now be comfortably reached via the driver's side of the vehicle 10.

Alternatively however, the environmental sensor system 6 may assess that the parking bay next to the co-driver's side of the vehicle is vacant and/or there is a large gap to the next vehicle. In that case, the system may define the co-driver's side of the vehicle to be the preferred access side instead of the driver's side even in this bay parking scenario.

FIG. 6 depicts an example for on-street parking and/or parallel parking, where the vehicle 10 parks parallel to and/or on a street 13. In that case the preferred access side of the motor vehicle 10 may be the lateral side of the motor vehicle 10 facing away from the street 13.

In the depicted example of FIG. 6, the vehicle 10 is driving on the street 13 and the child safety seat 1 is positioned first on the driver's side of the vehicle 10 (left of FIG. 6). The environmental sensor system 6 detects the direction of movement as well as other vehicles and the surroundings. As soon as the vehicle 10 has reached a parallel parking position on the street 13, the sensor system 6 determines the traffic situation. Furthermore, the sensor system 6 determines on which side of the vehicle 10 the pavement 12 is situated. In the depicted example, the pavement 12 is on the co-driver's side of the vehicle 10. Thus, the child safety seat 1 moves to the co-driver's side of the vehicle 10 (middle of FIG. 6), as the pavement 12 offers to exit/enter the vehicle 10 safely and comfortably. This is shown on the right of FIG. 6, where the child safety seat 1 has reached the final position on the co-driver's side of the vehicle 10.

The seat control system 11 thus automatically slides the child safety seat 1 to the side of the vehicle 10, which is the safer and more comfortable one for entering/exiting the vehicle 10. The child safety seat 1 may be moved only after the vehicle 10 has reached its current parking position or, alternatively, even before that on the basis of an estimated intended parking position of the vehicle 10. The system 11 works in an automated way and does not require the user/driver to take action.

Advantages offered by the above system 11 comprise an increase in safety for parent and child in everyday situations of entering/exiting a vehicle in typical parking situations like on-street and/or bay parking. The automated system 11 uses information from various connected sensors to detect the parking position/situation and to automatically initiate a repositioning of the child safety seat 1 if necessary. This can also be done in a predictive way based on navigation data and/or a driving history.

The rail system of the invention may also be used for other purposes. For example, it may enable more flexible access to seats in a third row in case the child safety seat 1 is installed on a back seat 2 of a second row. In that case the child safety seat 1 may be moved laterally in order to enable access to the third row, e.g. by folding down a backrest of a seat in the second row.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The embodiments were chosen and described in order to explain the principles of the invention and its practical applications, to thereby enable others skilled in the art to utilize the invention and various embodiments with various modifications as are suited to the particular use contemplated.

What is claimed is:

1. A method for automatic lateral repositioning of a child safety seat on a back seat of a motor vehicle, the child safety seat being configured to move laterally across the back seat between lateral sides of the motor vehicle, the method comprising:
    determining the lateral position of the child safety seat on the back seat of the motor vehicle;
    determining a current or intended parking situation of the motor vehicle, wherein the parking situation is determined based on a drive history of the motor vehicle;
    deciding which lateral side of the motor vehicle is a preferred access side for the determined parking situation; and
    laterally repositioning the child safety seat to a preferred position at the preferred access side of the motor vehicle;
    wherein determining the parking situation comprises determining the parking situation based on environmental data acquired by an environmental sensor system of the motor vehicle;
    wherein the environmental sensor system detects whether the parking situation includes Parallel parking, bay parking or angle parking; and
    wherein deciding which lateral side is preferred and laterally positioning the child safety seat to the preferred position are based on safety, working space, or convenience and also on whether the parking situation includes the parallel parking, the bay parking, or the angle parking.

2. The method according to claim 1, wherein the environmental sensor system detects that the parking situation includes parallel parking and wherein the preferred access side of the motor vehicle is the lateral side of the motor vehicle facing away from a street.

3. The method according to claim 1, wherein the environmental sensor system detects that the parking situation is bay parking or angle parking and wherein the preferred access side of the motor vehicle is a driver's side of the motor vehicle.

4. The method according to claim 1, wherein the parking situation is determined based on navigation data of a navigation system of the motor vehicle.

5. The method according to claim 1, further comprising determining if the child safety seat is occupied based on occupation data acquired by a seat occupancy sensor system of the motor vehicle.

6. The method according to claim 1, further comprising:
    determining that an object blocks movement of the child safety seat across the back seat to the preferred position on the preferred access side; and
    outputting a notification that the child safety seat cannot be moved to the preferred position on the preferred access side.

7. The method according to claim 1, further comprising locking the child safety seat in the preferred position until the parking situation requires a different lateral position of the child safety seat.

8. A seat control system for automatic lateral repositioning of a child safety seat on a back seat of a motor vehicle, the seat control system comprising:
    a determination unit configured to determine a lateral position of the child safety seat on the back seat of the motor vehicle and to determine a current or intended parking situation of the motor vehicle, wherein the parking situation is determined based on a drive history of the motor vehicle;
    a decision unit configured to decide which lateral side of the motor vehicle is a preferred access side for the determined parking situation;
    a seat actuation device configured to laterally reposition the child safety seat to a preferred position at the preferred access side of the motor vehicle by moving the child safety seat laterally across the back seat between lateral sides of the motor vehicle; and
    an environmental sensor system configured to acquire environmental data of the motor vehicle, wherein the determination unit is configured to determine the parking situation based on the environmental data, wherein the environmental sensor system is configured to detect whether the parking situation includes parallel parking, bay parking or angle parking;
    wherein the decision unit is configured to decide which lateral side is the preferred access side and the seat actuation device is configured to laterally position the child safety seat to the preferred access side based on safety, working space, or convenience and also on whether the parking situation includes the parallel parking, the bay parking, or the angle parking.

9. The seat control system according to claim 8, wherein the preferred access side of the motor vehicle is the lateral side of the motor vehicle facing away from a street in case of parallel parking, and wherein the preferred access side of the motor vehicle is a driver's side of the motor vehicle in case of bay parking or angle parking.

10. The seat control system according to claim 8, further comprising a seat occupancy sensor system configured to acquire occupation data of the child safety seat, wherein the determination unit is configured to determine if the child safety seat is occupied based on the occupation data.

11. The seat control system according to claim 8, further comprising a driver interface configured to output a notification that the child safety seat cannot be moved to the preferred position on the preferred access side in case an object blocks movement of the child safety seat across the back seat to the preferred position.

12. The seat control system according to claim 8, further comprising a locking device configured to lock the child safety seat in the preferred position until the parking situation requires a different lateral position of the child safety seat.

13. A seat control system for automatic lateral repositioning of a child safety seat on a back seat of a motor vehicle, the seat control system comprising:
   a processor;
   a memory storing instructions to be executed by the processor, the instructions causing the processor to:
     determine a lateral position of the child safety seat on the back seat of the motor vehicle;
     determine a current or intended parking situation of the motor vehicle, wherein the parking situation is determined based on a drive history of the motor vehicle; and
     decide which lateral side of the motor vehicle is a preferred access side for the determined parking situation; and
   a seat actuation device configured to laterally reposition the child safety seat to a preferred position at the preferred access side of the motor vehicle by moving the child safety seat laterally across the back seat between lateral sides of the motor vehicle; and
   an environmental sensor system configured to acquire environmental data of the motor vehicle, wherein the parking situation is determined based on the environmental data;
   wherein the environmental sensor system is configured to detect whether the current or intended parking situation comprises parallel parking, bay parking, or angle parking; and
   wherein deciding which lateral side is preferred and laterally positioning the child safety seat to the preferred side are based on safety, working space, or convenience, and also on whether the parking situation includes the parallel parking, the bay parking, or the angle parking.

14. The seat control system according to claim 13, further comprising a seat occupancy sensor system configured to acquire occupation data of the child safety seat.

15. The seat control system according to claim 13, further comprising a locking device configured to lock the child safety seat in the preferred position until the parking situation requires a different lateral position of the child safety seat.

* * * * *

UNITED STATES PATENT AND TRADEMARK OFFICE
CERTIFICATE OF CORRECTION

| | |
|---|---|
| PATENT NO. | : 11,603,015 B2 |
| APPLICATION NO. | : 16/577433 |
| DATED | : March 14, 2023 |
| INVENTOR(S) | : Regina Kaiser et al. |

It is certified that error appears in the above-identified patent and that said Letters Patent is hereby corrected as shown below:

In the Claims

Claim 1, Column 9, Line 66; delete "Parallel" and insert --parallel--.

Signed and Sealed this
Eleventh Day of April, 2023

Katherine Kelly Vidal
*Director of the United States Patent and Trademark Office*